W. H. SEALS.
END GATE.
APPLICATION FILED NOV. 9, 1914.
1,156,498.
Patented Oct. 12, 1915.
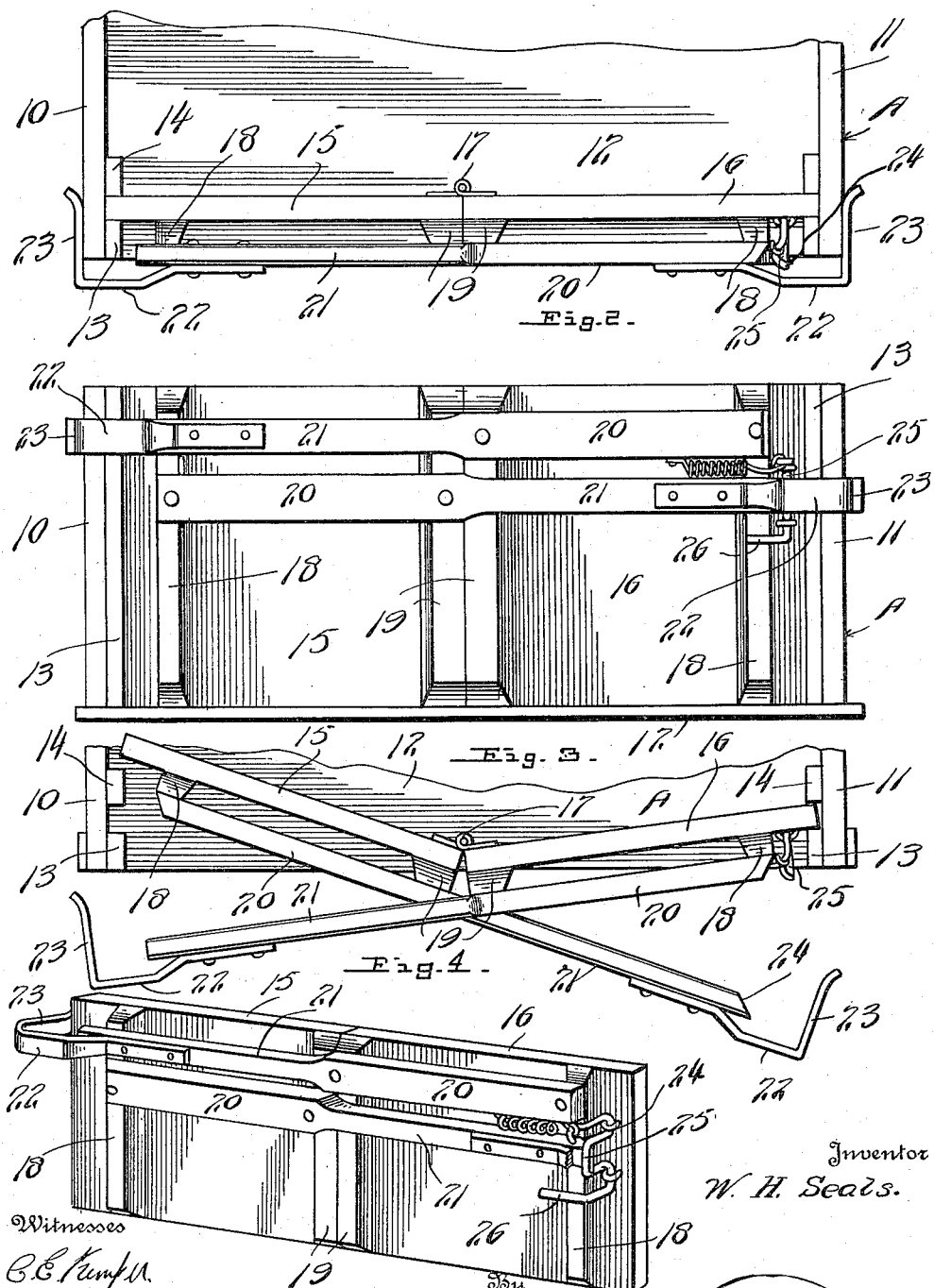

UNITED STATES PATENT OFFICE.

WADE H. SEALS, OF ROSSVILLE, ILLINOIS.

END-GATE.

1,156,498.  Specification of Letters Patent.  Patented Oct. 12, 1915.

Application filed November 9, 1914. Serial No. 871,117.

*To all whom it may concern:*

Be it known that I, WADE H. SEALS, a citizen of the United States, residing at Rossville, in the county of Vermilion, State of Illinois, have invented certain new and useful Improvements in End-Gates; and I do hereby declare the following to be a full, clear, and exact description of the invention, such as will enable others skilled in the art to which it appertains to make and use the same.

This invention relates to end-gates.

The object of the invention is to provide an end-gate which may be readily applied to and removed from a wagon body without the necessity of sliding same downward and upward between the cleats carried by the wagon body, and which will enable the use of transverse rods ordinarily employed to connect the sides of a wagon body to be dispensed with.

A further object of the invention is to provide an end-gate which can be applied to a wagon body without manipulating any fastening device, and which in closing will lock automatically.

With the above and other objects in view the invention consists in the details of construction and in the arrangement and combination of parts to be hereinafter more fully described and particularly pointed out in the appended claims.

In describing the invention in detail reference will be had to the accompanying drawings wherein like characters of reference denote corresponding parts in the several views, and in which—

Figure 1 is a plan view of the rear end of a wagon body showing the improved end gate fully applied; Fig. 2, a rear view of what is shown in Fig. 1; Fig. 3, a view similar to Fig. 1 showing the end-gate partially applied, and Fig. 4, a perspective view of the end gate.

Referring to the drawings A indicates generally a wagon body including side members 10 and 11, and a bottom 12. Secured to the inner sides of the side members 10 and 11 respectively are cleats 13 and 14 between which the ends of the end-gate are engaged when the latter is applied.

The improved end-gate is shown as comprising sections 15 and 16 hingedly connected together at 17 in such manner that the inner ends of said sections can swing outwardly when the gate is applied and unlocked but cannot swing inwardly. Secured to the outer side of each section 15 and 16 are transverse bars 18 and 19 which serve to materially strengthen the sections 15 and 16. Secured to the bars 18 and 19 of each section 15 and 16 longitudinally of said sections are arms 20. The adjacent ends of these arms 20 are extended oppositely as at 21 so as to overlap the adjacent section of the gate. Secured to the free end of each extension 21 is an L-shaped member, including arms 22 and 23 the former of which is attached to the extension 21 while the latter is disposed in spaced relation to the end of said extension and is adapted to overlap one of the side members of the wagon body when the gate is applied whereby said side members of the wagon body are positively held against spreading without the use of the usual connecting rod between the side members. By dispensing with this connecting rod it will be obvious that the side members of the wagon body can be easily and quickly removed. The free end of the extension 21 of the bar 20 which is attached to the section 15 is beveled as at 24 for coöperation with a spring latch 25 mounted upon the section 16. As the sections 15 and 16 are moved into alinement in applying the end-gate the beveled end 24 will coöperate with the latch 25 until the section 21 has passed the holding portion of said latch when the latter will under the influence of the spring, move over the end of the extension 21, thereby automatically locking the sections 15 and 16 in alinement and consequently preventing disengagement of the outer ends of the sections 15 and 16 from between the cleats 13 and 14. To disengage the end-gate it is only necessary to pivot the latch 25 by means of a handle 26 until said latch is out of engaging relation with respect to the extension 21. The inner ends of the sections 15 and 16 can then be forced outwardly and the outer ends of said sections disengaged from between the cleats 13 and 14.

What is claimed is:—

1. An end-gate comprising hingedly connected sections, an arm secured to each section and adapted to overlie the other section when said sections are alined, means for locking said sections in alinement, and angular extensions on said arms respectively engageable against the outer faces of the sides of a wagon when the gate is applied.

2. An end-gate comprising hingedly connected sections, an arm secured to each section and adapted to overlie the other section when said sections are alined, a latch carried by one section and automatically engageable with the arm on the other section to lock said sections in alinement, and angular extensions on said arms respectively engageable against the outer faces of the sides of a wagon when the gate is applied.

In testimony whereof, I affix my signature, in the presence of two witnesses.

WADE H. SEALS.

Witnesses:
  LOYD JAYNES,
  WILLIAM PAYNE.

Copies of this patent may be obtained for five cents each, by addressing the "Commissioner of Patents, Washington, D. C."